R. HUGHES.
MEANS FOR SEPARATING MINERALS FROM ALLUVIAL WASH.
APPLICATION FILED AUG. 22, 1912.
1,048,171.  Patented Dec. 24, 1912.
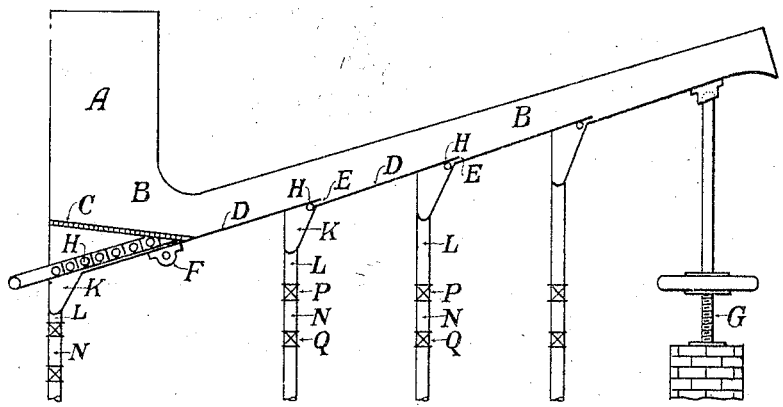
FIG: 1
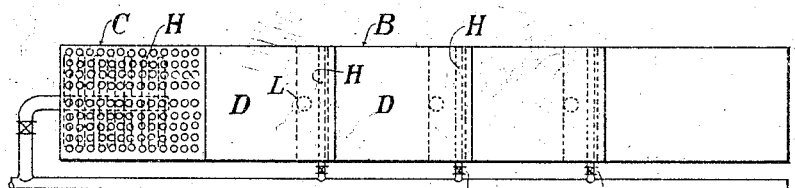
FIG: 2
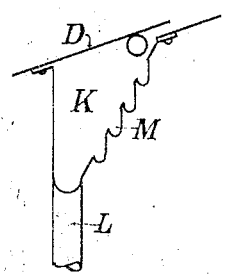
FIG: 3

UNITED STATES PATENT OFFICE.

REES HUGHES, OF WILSON'S DOWNFALL, NEW SOUTH WALES, AUSTRALIA.

MEANS FOR SEPARATING MINERALS FROM ALLUVIAL WASH.

1,048,171.   Specification of Letters Patent.   Patented Dec. 24, 1912.

Application filed August 22, 1912. Serial No. 716,506.

*To all whom it may concern:*

Be it known that I, REES HUGHES, a subject of the King of the United Kingdom of Great Britain and Ireland, residing at Wilson's Downfall, in the State of New South Wales, Commonwealth of Australia, have invented certain new and useful Improvements in Means for Separating Minerals from Alluvial Wash; and I do hereby declare the following to be a full, clear, and exact description of the invention, such as will enable others skilled in the art to which it appertains to make and use the same.

My invention relates to improvements in means for recovering the mineral content of alluvial wash obtained by dredging or sluicing plants.

I am aware of many of the devices of riffles, sluice boxes and other devices, that fail to extract the desired minerals, or are costly in construction, or in working. After considerable experience in treatment, I have devised an apparatus that will give very satisfactory results at a low working cost and is not expensive to make.

My invention consists of a bent trunk-way of special construction, pivoted at or near the angle, and having one end extending upward while the other end is more or less horizontal, but so designed that the slope can be varied through a reasonable limit and held in any desired position.

The portion that is nearly horizontal is divided up into a number of shallow compartments the full width of the trunk-way, each compartment being open to the trunk-way at its higher end through the overlapping plate forming the top of the compartment, not quite fitting down on the next plate so leaving a narrow slit across the trunk. The lower end of each of the compartments is provided with a drain pipe having a length of glass tube in it so that the material passing from any compartment can readily be seen. The lower compartment has a grid instead of the narrow slit. At the lower end of each slit is a perforated pipe connected to a source of water supply under pressure, each provided with a cock for controlling same, and the pipe is so arranged that the streams of water go up the slit into the trunk-way. Each extremity of the trunk-way is open while the whole is filled with water: the higher for the reception of the alluvial to be treated, the lower for the passage of the tailings.

In order that my invention may be better understood I will now describe it with the aid of the accompanying drawings, in which—

Figure 1, is a side sectional elevation of my improved separator. Fig. 2, is a plan of same (the chute being omitted). Fig. 3, is a detail view (to an enlarged scale) showing a riffle box which may be fitted in order to save any gold that may be in the alluvial wash.

In carrying my invention into effect I form a trunk-way of suitable material having a receiving chute "A" approximately upright, and a portion "B" wherein the metal is separated. This portion is approximately or nearly at right angles to the receiving chute "A," being more or less horizontal. The chute "A" and sides and top of the portion "B" are made fairly even on the inner side, but the floor of the portion "B," forming the separating tables is made with a grid or screen "C" at the angle either horizontal or sloping as shown in the drawings, and a number of plates "D," the upper end of each of which overlaps the lower end of the succeeding plate, a small slit "E" being provided between such overlapping portions. This trunk-way "A," "B" is carried at or near the angle on a pivot "F" and at the opposite end of the separating tables "D" on suitable means (such as the screw "G") whereby such end may be raised or lowered according to the nature of the material being put through. Perforated or slotted pipes "H" connected up to a source of water supply under pressure and provided with cocks "J" by which either pipe may be cut off if necessary are placed near the slits "E." Similar pipes "H" are also placed and arranged so that the water therefrom impinges up under the grid "C."

Immediately under the grid "C" and each of the slits "E" I place a small receiving hopper or chute "K" from which lead pipes "L." One side of the hopper "K" may be sloped as shown, and if the material being treated contains any gold, riffles or pockets "M" (as in Fig. 3) may be formed in stepped arrangement on the surface thereof in which mercury may be placed. Said pockets are relatively deep to form troughs or channels suitable for holding baths of mercury of appreciable depths. The pipes "L" are each provided with a short length of glass tube "N" above and below which are cocks "P" "Q."

The method of operating my improved separator is as follows:—The separator having been constructed and arranged in a convenient position for the proper working of the plant, the water supply cocks "J" and cocks "P" are opened and cocks "Q" closed. The alluvial wash is fed into the top of the chute "A" whence it passes down over the grid "C" and up the trunk-way "B" over the tables "D." As it does so, the mineral contained therein falls to the bottom and the bulk of it finds its way through the grid "C" and into the hopper "K." Any mineral that may not be released finds its way up the first plate "D" to the upper edge thereof where it falls over and passes through the slit "E" into the hopper "K," and so on up the separating tables until practically all the mineral has been released, a suitable number of plates "D" being provided to suit the nature of the material being treated, and tailings pass over the end of the last plate on to the ground or into a suitable receptacle to be afterward removed.

While the alluvial wash is passing up the tables the water from the perforated or slotted pipes "H" keeps the material in agitation and not only forces back the water passing up the table, but also washes back any particles lighter than the mineral.

The mineral that is caught may be seen in the glass tubes "N" and as the latter become filled the top cocks "P" are closed and the bottom ones "Q" opened and as the mineral passes away the cocks "Q" and "P" are closed and opened respectively and so on.

The details of carrying my invention into effect may be varied without affecting same, for instance, I do not bind myself to the exact means described and shown for adjusting the level of the separating tables, since other devices may be used.

What I do claim as my invention, and desire to secure by Letters Patent is:—

1. In a separating apparatus, the combination of an inclined trough; a chute adapted to receive the material to be separated; a laterally disposed screen mounted in the chute immediately beneath the hopper; a plurality of water distributing pipes located between the bottom of the chute and said screen; and a hopper disposed at the lower end of the trough and adapted to receive the separated material, substantially as described.

2. In a separating apparatus, the combination of a trough having overlapping plates providing a slot through which the material passes, and a chute adapted to receive the material to be separated; a laterally disposed screen mounted on the trough immediately beneath said chute; water distributing pipes located immediately beneath said screen, and in the slot provided by said overlapping plates; hoppers located respectively beneath the screen and said slot; and a pipe connected to each of said hoppers adapted to collect the separated material.

In testimony whereof, I affix my signature, in presence of two witnesses.

REES HUGHES.

Witnesses:
 E. GARLAND ABELL,
 OLIVE K. ABELL.